United States Patent [19]

Thomsen

[11] 3,714,301

[45] Jan. 30, 1973

[54] ORGANIC THIOPHOSPHATES OF IMPROVED ODOR CHARACTERISTICS AND PROCESS FOR THEIR PRODUCTION

[75] Inventor: Morten Thomsen, 7620 Lemvig, Denmark

[73] Assignee: A/S Cheminora, Lemvig, Denmark

[22] Filed: Dec. 16, 1969

[21] Appl. No.: 885,617

[30] Foreign Application Priority Data

Dec. 23, 1968 Denmark....................................6336

[52] U.S. Cl..................................260/942, 260/989
[51] Int. Cl.................................................C07f 9/08
[58] Field of Search................................260/942, 980

[56] References Cited

UNITED STATES PATENTS

| | | | |
|---|---|---|---|
| 2,962,521 | 11/1960 | Usui | 260/989 |
| 3,309,432 | 3/1967 | English | 260/989 |
| 3,439,071 | 4/1969 | Marks et al | 260/989 |
| 3,440,305 | 4/1969 | Divine | 260/990 |

Primary Examiner—Lewis Gotts
Assistant Examiner—Richard L. Raymond
Attorney—Beveridge & De Grandi

[57] ABSTRACT

Removal from or/and inhibition of development of bad odor in, organic thiophosphate products, such as O,O-dimethyl-S-(1,2-carbethoxy ethyl)-dithiophosphate products. The desired result is obtained by treating the thiophosphate product with a small amount of a nitrogen oxide, preferably dinitrogen tetraoxide (nitrogen dioxide) or dinitrogen trioxide, or an inorganic or organic nitrite, such as ethyl nitrite or isoamyl nitrite.

19 Claims, No Drawings

ORGANIC THIOPHOSPHATES OF IMPROVED ODOR CHARACTERISTICS AND PROCESS FOR THEIR PRODUCTION

The present invention relates to organic thiophosphate products and a process for treating organic thiophosphate products with a view to deodorizing such products or retarding their development of an unpleasant smell. The expression "thiophosphates" is here meant to cover not only monothiophosphates but also dithiophosphates.

It is a well-known fact that the organic thiophosphates, and in particular O,O-dimethyl-S-(1,2-dicarbethoxyethyl)-dithiophosphate or compounds related thereto, which are widely employed as pesticides, are inclined to develop a highly unpleasant smell which, presumably, as far as the main part is concerned, is due to the formation of small amounts of mercaptan compounds. Even if the thiophosphate is refined, for instance by means of steam distillation, the problem of the unpleasant smell is not solved as the thiophosphate is not stable when stored, but will again develop a strong unpleasant smell within a relatively short period of time.

Consequently, various attempts have been made to overcome these difficulties by the addition or introduction of various substances which act as deodorizing agents.

In the most important of these processes, certain oxidizing agents are added, particularly peroxides or ozone or, possibly, certain metal compounds in the presence of oxygen or peroxides. There are, however, certain disadvantages in the use of the proposed oxidizing agents. They are, inter alia, relatively expensive. Even if it is stated that ozone is cheaper in use than peroxides, the production and use of ozone nevertheless still is relatively expensive. Furthermore, it has been stated that the employment of the proposed oxidizing agents have, in many cases, resulted in the sulphur atom being replaced by an oxygen atom.

However, it has now been found that it is possible to obtain an excellent effect in deodorizing products consisting of or containing thiophosphates, or in retarding the development of unpleasant smell in such products, by means of the process according to the present invention which is characterized in that the product is treated with a small amount of a nitrogen oxide or a mixture of nitrogen oxides or an inorganic or organic nitrite.

Preferably, dinitrogen tetraoxide and/or nitrogen dioxide are/is used as nitrogen oxide. Dinitrogen tetraoxide, as is well-known, boils at approximately 21°C and the vapors of the liquid contain a mixture of dinitrogen tetraoxide and nitrogen dioxide, more of latter compound being present higher the temperatures. When in the following specification with claims mention is made of "dinitrogen tetraoxide," then dinitrogen tetraoxide as such or nitrogen dioxide or mixtures thereof are to be understood by this term. In the following description of the invention the nitrogen oxide used is first and foremost "dinitrogen tetraoxide," but what is said in connection with this oxide applies also—with the necessary modifications—to the use of the other nitrogen oxides, $N_2O$, $NO$, $N_2O_3$ and $N_2O_5$.

The use of nitrogen oxide or nitrite for the purpose dealt with is cheaper than the use of any of the agents proposed previously. At the same time, it is more effective since for obtaining the same deodorizing effect, or retarding effect in respect of the development of unpleasant smell, the addition of so large an amount will normally not be necessary as in the case of the known agents. The possibility of the thiophosphate being decomposed is thereby reduced to a minimum. It has actually proved possible to produce thiophosphate products having a thiophosphate concentration above the one customarily obtained.

The employment of dinitrogen tetraoxide for the purpose dealt with here is particularly advantageous on account of the fact that it is possible to introduce the oxide into the thiophosphate product with great effect at a relatively low temperature, i.e., at room temperature or even below that. It is thus possible to simply introduce the liquid oxide by stirring same into the product which is to be treated. However, it will normally be most practical to bring the dinitrogen tetraoxide in a gaseous form and possibly mixed with a carrier gas as, for instance, atmospheric air, into contact with the liquid or liquefied product which is to be treated.

The latter embodiment, which is also made use of when using other nitrogen oxides, may in practice be carried out in several different ways, part of which is known per se, inter alia from the above-mentioned known treatment with ozone. It is thus possible to allow the gas to bubble into and through the liquid or liquefied thiophosphate product in a container, while at the same time, if so desired, stirring the product. Or the gas and the thiophosphate product may be brought into contact in a column filled with Raschig rings. An expedient embodiment, moreover, consists in the treatment being carried out in a container which contains the liquid thiophosphate product and above same a gas phase consisting of a mixture of nitrogen oxide with air, while stirring or whipping the gas into the product.

The quantity of nitrogen oxide or nitrite which is to be introduced into the product to be treated depends, naturally, on how impure this product is. By way of example, it may be mentioned that it is possible, when introducing dinitrogen tetraoxide into O,O-dimethyl-S-(1,2-dicarbethoxy ethyl)-dithiophosphate, which is only to a slight degree contaminated with malodorous substances, to restrict the added amount to as little as 0.2 per thousand or less than that, calculated on the thiophosphate. In other cases, it may be advisable to introduce a somewhat larger quantity, e.g. up to 1 per thousand or possibly more.

Just as in the known ozone treatment, it is also possible in the present case, subsequent to the treatment with nitrogen oxide, to perform, if so desired, an after-treatment consisting in blowing air or other gas through the thiophosphate product with a view to expelling remaining volatile substances like, for example, remaining nitrogen oxide. It is, however, advantageous in certain circumstances for the treated product to contain a certain amount of nitrogen oxide in a free or combined form with a view to obtaining a considerable long duration of effect.

In the above, the employment of nitrogen oxides in a liquid or gaseous form has been specifically dealt with. As mentioned, it is possible to add small quantities of inorganic or organic nitrites to the product. Such nitrites may possibly also be formed in situ in a manner known per se. Preferably, alkali nitrites are used as inorganic nitrites. Alkyl nitrites, as for example ethyl nitrite, may conveniently be used as organic nitrites. By way of example, it is possible for ethyl nitrite to be formed in situ by introduction into the product which is to be treated, of a suitable nitrogen oxide, such as dinitrogen trioxide or dinitrogen tetraoxide and the requisite quantity of ethyl alcohol. The latter may possibly already be present in small amounts as an impurity in the product to be treated. Other alkyl nitrites may be formed in a similar manner.

The invention is generally applicable for the treatment of all malodorous thiophosphates. It is of especially great practical importance at present for treating the organic dithiophosphate O,O-dimethyl-S-(1,2-dicarbethoxy ethyl)-dithiophosphate, which is exceptionally widely used in practice.

The invention is explained in greater detail in the following examples, which are merely to be regarded as representative examples, since the invention is not restricted to the substances and operating conditions stated therein.

EXAMPLE 1

1,000 parts by weight of industrial O,O-dimethyl-S-(1,2-dicarbethoxyethyl)-dithiophosphate were placed in a tank equipped with an agitator. At room temperature, 0.3 parts by weight of liquid dinitrogen tetraoxide were added in the course of approximately 2 minutes, and agitation was continued until a good distribution of the added oxide had been ensured.

100 grammes of the dithiophosphate thus treated were left in a sealed glass container at 55°C. After having been standing for 2 weeks at this temperature, no unpleasant smell had yet appeared.

EXAMPLE 2

20 tons of industrial O,O-dimethyl-S-(1,2dicarbethoxyethyl)-dithiophosphate were placed in a tank which, at the top, was provided with a column of stainless steel filled with 2 inch Raschig rings. The height of the column was 1,200 mm and its diameter 600 mm. In the bottom of the column 8 kg of gaseous dinitrogen tetraoxide were supplied over a period of 8 hours, while the technical thiophosphate product was circulated through the column by pumping it from the bottom of the tank to the top of the column of a rate of 12 tons per hour.

The thiophosphate product thus treated did not, even after having been left standing for approximately 3 weeks at 50°C, have any unpleasant smell.

EXAMPLE 3

1,000 parts by weight of industrial O,O-dimethyl-S-(1,2-dicarbethoxyethyl)-dithiophosphate, which had been left standing for 2 weeks at 55°C and which had acquired an unpleasant mercaptide smell on account of this, were placed in a tank equipped with an agitator. At room temperature, 0.2 parts by weight of gaseous dinitrogen trioxide were supplied, by admitting the oxide in the course of approximately 2 minutes through a tube submerged in the liquid. The unpleasant smell disappeared practically immediately from the thiophosphate product.

EXAMPLE 4

1 part by weight of sodium nitrite was added at room temperature to 1,000 parts by weight of the malodorous dithiophosphate product mentioned in Example 3. After having been left standing for a couple of days at this temperature, a significant improvement in the smell of the product was observed.

EXAMPLE 5

1,000 parts by weight of industrial O,O-dimethyl-S-(1,2-dicarbethoxyethyl)-dithiophosphate were placed in a tank equipped with an agitator, and at room temperature 0.5 parts by weight of ethyl nitrite were added in the course of approximately 2 minutes and distributed well in the liquid.

The product thus treated did not, even after having been left standing for approximately 3 weeks at 50°C, acquire any unpleasant smell.

EXAMPLE 6

Example 5 was repeated, with the only difference that instead of ethyl nitrite, 0.7 parts by weight of isoamyl nitrite were added. A corresponding effect was obtained.

EXAMPLE 7

Example 5 was repeated, with the only difference that instead of ethyl nitrite, first 0.5 parts by weight of ethyl alcohol and then 0.3 parts by weight of liquid dinitrogen tetraoxide were added. A corresponding effect was obtained.

EXAMPLE 8

20 tons of industrial O,O-dimethyl-S-(1,2--dicarbethoxyethyl)-dithiophosphate were placed in a tank provided with a column of stainless steel as described in Example 2. During circulation of the industrial product through the column in the manner described in Example 2, 20 kg of ethyl alcohol were first supplied in the bottom of the column at room temperature. When the alcohol was distributed in the thiophosphate product, 8 kg of gaseous dinitrogen tetraoxide were supplied by employing the technique stated in Example 2.

After having been left standing at 55°C, even after a couple of weeks, no unpleasant smell had appeared in the product obtained.

EXAMPLE 9

Example 8 was repeated, with the only difference that instead of dinitrogen tetraoxide, dinitrogen trioxide was used. A corresponding effect was obtained.

EXAMPLE 10

1,000 parts by weight of industrial O,O-dimethyl-S-(1,2-carbethoxyethyl)-dithiophosphate, which had been left standing at 55°C for 2 weeks and which had acquired an unpleasant mercaptide smell on account of this, were placed in a tank provided with an agitator and, in the course of approximately 2 minutes at room temperature, 0.5 parts by weight of ethyl nitrite were added.

The unpleasant smell disappeared practically immediately.

EXAMPLE 11

Example 10 was repeated, with the only difference that instead of ethyl nitrite, 0.7 parts by weight of isoamyl nitrite were added. A corresponding effect was obtained.

EXAMPLE 12

Example 10 was repeated, with the only difference that instead of ethyl nitrite, first 0.5 parts by weight of ethyl alcohol and after this 0.3 parts by weight of liquid dinitrogen tetraoxide were added. A corresponding effect was obtained.

I claim:

1. A process of improving the odor characteristics of organic monothiophosphates and dithiophosphates tending to develop an unpleasant mercaptan-like odor, comprising treating the thiophosphate with a small amount of a substance selected from the group consisting of nitrogen oxides and inorganic and alkyl nitrites.

2. A process as claimed in claim 1, in which the said thiophosphate is treated with dinitrogen tetraoxide.

3. A process as claimed in claim 1, in which the said thiophosphate is treated with dinitrogen trioxide.

4. A process as claimed in claim 1, in which the said thiophosphate is treated with an alkyl nitrite.

5. A process as claimed in claim 4, in which the thiophosphate is treated with ethyl nitrite.

6. A process as claimed in claim 4, in which the thiophosphate is treated with isoamyl nitrite.

7. A process as claimed in claim 4, in which the alkyl nitrite is formed in situ from the appropriate alcohol and nitrogen oxide.

8. A process as claimed in claim 1, in which the said thiophosphate is treated with an alkali nitrite.

9. A process of reducing the tendency of developing bad odor in O,O-dimethyl-S-(1,2-dicarbethoxyethyl)-dithiophosphate and other monothiophosphates and dithiophosphates tending to develop an unpleasant mercaptan-like odor, comprising mixing the freshly prepared thiophosphate with a small amount of dinitrogen tetraoxide, dinitrogen trioxide or an alkyl nitrite.

10. A process as claimed in claim 9, in which ethyl or isoamyl nitrite is used.

11. A process of deodorizing badly smelling O,O-dimethyl-S-(1,2-dicarbethoxyethyl)-dithiophosphate and other monothiophosphates and dithiophosphates tending to develop an unpleasant mercaptan-like odor, comprising mixing the badly smelling thiophosphate with a small amount of dinitrogen tetraoxide, dinitrogen trioxide or an alkyl nitrite.

12. A process as claimed in claim 11, in which ethyl or isoamyl nitrite is used.

13. A process of improving the odor characteristics of O,O-dimethyl-S-(1,2-dicarbethoxyethyl)-dithiophosphate products comprising treating the products with a small amount of a substance selected from the group consisting of dinitrogen tetraoxide, dinitrogen trioxide, sodium nitrite, ethyl nitrite, and isoamyl nitrite.

14. Organic monothiophosphates and dithiophosphates tending to develop an unpleasant mercaptan-like odor containing a small amount of a substance selected from the group consisting of nitrogen oxides and inorganic and alkyl nitrites.

15. Organic monothiophosphates and dithiophosphates tending to develop an unpleasant mercaptan-like odor as claimed in claim 14, containing a small amount of dinitrogen tetraoxide or dinitrogen trioxide.

16. Organic monothiophosphates and dithiophosphates tending to develop an unpleasant mercaptan-like odor as claimed in claim 14, containing a small amount of an alkyl nitrite.

17. Organic monothiophosphates and dithiophosphates tending to develop an unpleasant mercaptan-like odor as claimed in claim 16, containing a small amount of ethyl nitrite.

18. Organic monothiophosphates and dithiophosphates tending to develop an unpleasant mercaptan-like odor in claim 16, containing a small amount of isoamyl nitrite.

19. Organic thiophosphate product containing O,O-dimethyl-S-(1,2-dicarbethoxyethyl)-dithiophosphate and a small amount of a substance selected from the group consisting of dinitrogen tetraoxide, dinitrogen trioxide, sodium nitrite, ethyl nitrite, and isoamyl nitrite.

* * * * *